United States Patent [19]

Jerman et al.

[11] Patent Number: 5,205,312
[45] Date of Patent: Apr. 27, 1993

[54] FIRE HYDRANT LOCKING ARRANGEMENT

[75] Inventors: James K. Jerman, Northport; Guido Salvato, Garden City, both of N.Y.

[73] Assignee: Magna-Loc Valve Corp., Garden City, N.Y.

[21] Appl. No.: 893,213

[22] Filed: Jun. 2, 1992

[51] Int. Cl.⁵ .................. F16K 31/08; F16K 35/16
[52] U.S. Cl. .................. 137/15; 70/175;
70/231; 70/232; 81/176.1; 137/296; 137/382;
137/384.2; 192/841 M; 220/284; 220/725;
220/726; 251/65; 251/89; 251/271; 251/292;
403/1; 403/2; 403/19; 403/20; 403/DIG. 1
[58] Field of Search .................. 70/175, 231, 232, 276;
137/15, 296, 377, 382, 382.5, 384.2; 192/800, 84
PM; 220/284, 724, 725, 726; 81/125, 176.1,
176.15, 176.2; 251/65, 89, 291, 292; 403/1, 2,
19, 20, DIG. 1

[56] References Cited

U.S. PATENT DOCUMENTS

| 3,840,041 | 10/1974 | McMurray | 137/296 |
| 3,916,939 | 11/1975 | Gillard | 137/296 |
| 4,336,698 | 6/1982 | Hurd | 70/231 |
| 4,390,038 | 6/1983 | Salvato | 137/296 |
| 4,620,428 | 11/1986 | Kopesky | 251/65 |
| 4,716,922 | 1/1988 | Camp | 137/296 |
| 4,936,336 | 6/1990 | McCauley et al. | 137/296 |
| 5,072,750 | 12/1991 | Poms et al. | 137/296 |

Primary Examiner—George L. Walton
Attorney, Agent, or Firm—Scully, Scott, Murphy & Presser

[57] ABSTRACT

A fire hydrant locking arrangement which is intended for utilization on a conventional fire hydrant. Moreover, also disclosed is a method of producing a fire hydrant locking arrangement through a heat-meltable locking ring which will inhibit the unauthorized opening of fire hydrants while facilitating the ready servicing of the internal components of the fire hydrant.

17 Claims, 2 Drawing Sheets

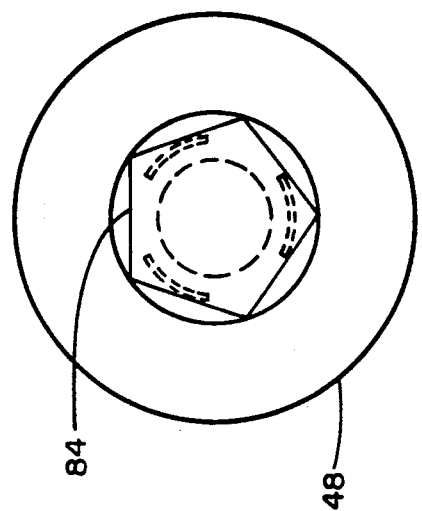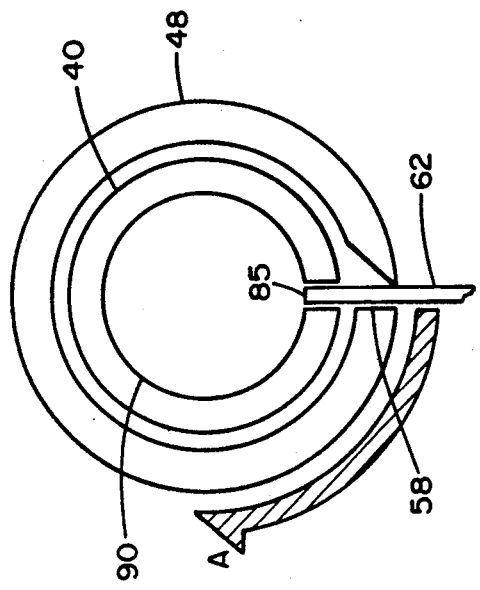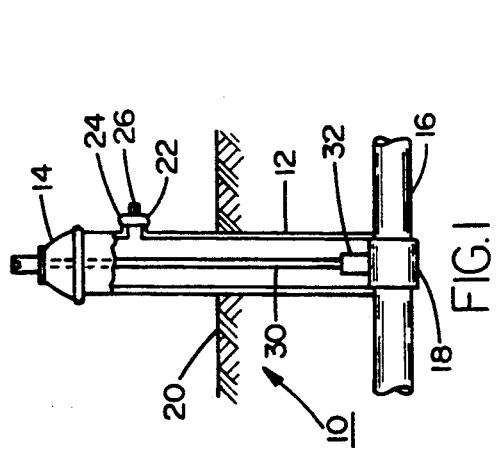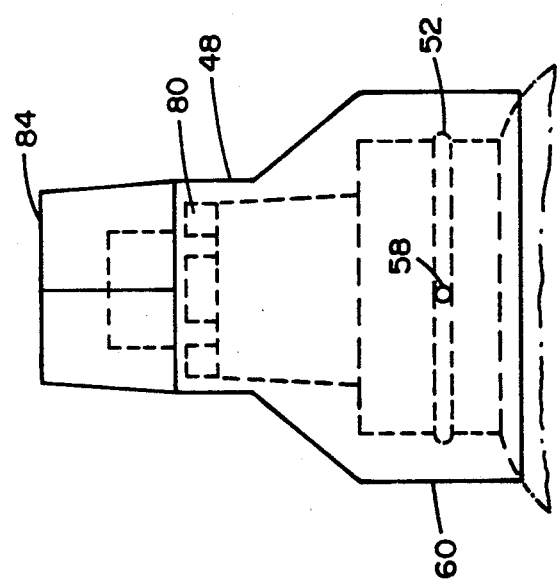

FIRE HYDRANT LOCKING ARRANGEMENT

BACKGROUND OF THE INVENTION

1. Field of the Invention

The present invention relates to a fire hydrant locking arrangement which is intended for utilization on a conventional fire hydrant. Moreover, the present invention also relates to a novel and unique method of producing a fire hydrant locking arrangement which will inhibit the unauthorized opening of fire hydrants while facilitating the ready servicing of the internal components of the fire hydrant.

In many geographical areas, and especially in sizeable towns and cities, serious problems have been encountered as a consequence of the unauthorized and possibly unlawful opening of fire hydrants. Ordinarily, fire hydrants each include an upstanding pipe or standpipe closed at the upper end by a bonnet. The standpipe is usually equipped with a water discharge connection (normally for attaching a fire hose) in its circumferential wall, which is maintained in a plugged condition, and a valve in the lower end of the standpipe communicates with a water main below ground, which valve is actuated by suitable rotation of a valve stem extending upwardly through the bonnet of the fire hydrant, in order to control the flow of water through the fire hydrant to the discharge connection. The valve stem is generally equipped with a polygonally-sided portion at its upper protruding end, which may be rotated through the manipulation of a suitable tool when coupled thereto, such as a wrench, in order to open the valve and initiate (or conversely to close the valve and inhibit) a flow of water from the fire hydrant through the water discharge connection. During the normally hot and sweltering summer months encountered in many locales, fire hydrants are frequently unauthorizedly opened by children and adults and a flow of water initiated to provide a cooling effect in that the water is permitted to spray and/or flow into the street so as to enable bathing or immersion therein and to run off along gutters into sewers or the like. However, when an appreciable number of fire hydrants are simultaneously opened in any particular locale, the water pressure in that area may tend to fall off to such a low level as to prevent adequate water pressure from being available should an emergency arise, such as a fire necessitating the use of fire hoses to douse the conflagration. Moreover, the excessive use of water in geographic areas which are subject to drought conditions requires that the frequently limited stored supply of water be safeguarded at all times from any unauthorized depletion.

In order to prevent the unauthorized and/or unlawful opening of fire hydrants, provision has been made heretofore to uncouple the upper protruding end of the hydrant post or stem from the valve actuating mechanism which is contained within the body or standpipe of the fire hydrant, and to operatively connect these components through the use of suitable special tools when it is desired to actuate the waterflow valve; for example, through the use of magnetic wrenches or the like which are not readily accessible to the general public. Other types of constructions contemplate equipping the upper end of the post or valve stem which extends from the bonnet on the fire hydrant with superimposed cylindrical members, of which one is secured to the post and another encompasses the first-mentioned cylindrical member so as to be rotatable relative thereto, and which will prevent any unauthorized rotation of the post and actuation of the fire hydrant valve without the utilization of a specialized tool with one of the relatively rotatable cylindrical members.

2. Discussion of the Prior Art

Among various patents which disclose operating mechanisms for actuating fire hydrant valves or the like in order to control the flow of water from the fire hydrants, and in which the mechanism is mounted on the upper ends of fire hydrant valve stems projecting from the bonnets of the fire hydrants, and which include relatively rotatable cylindrical members protectively encompassing the post, consideration must be given to Kopesky U.S. Pat. No. 4,620,428. In that instance, the lock and coupling apparatus for securing fire hydrants against unauthorized opening thereof, includes an inner cylindrical member which is fixedly connected to a post so as to be secured against relative rotation therewith, and whereby an outer cylindrical member encompassing the upper end of the post for the valve and the inner cylinder which is fastened to the post, is essentially connected to the inner cylindrical member so as to be rotatable relative thereto but secured against axial displacement and separation therefrom. Consequently, the application of a rotational moment or torque to the outer cylindrical member will not be transmitted to the inner cylindrical member and to the therewith secured post, thereby inhibiting actuation of the fire hydrant valve, until such time as an appropriate tool designed for this purpose is employed with the outer cylindrical member, such as a tool which may be in the form of a wrench incorporating a magnet adapted to attract a passive magnetic locking member for securing the outer and inner cylindrical members against relative rotation, and thereby enabling actuation of the valve post for controlling the valve and, resultingly, the flow of water from the fire hydrant. The outer and inner cylindrical members are coupled with each other through the intermediary of either a plastic or possibly metallic snap ring engaging in cooperating grooves formed in facing circumferential surfaces of the cylindrical members; and in order to be able to separate the cylindrical members, such as for gaining access to the interior of the fire hydrant, a considerable axial force has to be exerted to the outer cylindrical member to shear through the snap ring. This may result in extensive damage to the grooves in the ring members, and possibly render the latter unusable for subsequent applications, entailing considerable replacement or machining expenditures.

Camp U.S. Pat. No. 4,716,922 discloses a magnetic fire hydrant guard in which a ring member is fastened to an upstanding valve-actuating post of a fire hydrant through the intermediary of a radially extending locking screw, and with an outer ring member being positioned thereover and fastened thereto. This fails to provide the appropriate protection against tampering with the operating structure of the fire hydrant by an unauthorized person as contemplated by the present invention.

McMurray U.S. Pat. No. 3,840,041 discloses a magnetic lock and wrench structure for fire hydrants, wherein an outer ring member is adapted to encompass an internal ring member which is fastened a post employed for actuating a fire hydrant valve. There is no disclosure of a locking arrangement between the outer and inner cylindrical ring members or cylinders adapted to prevent axial separation while concurrently allowing for relative rotation between the members.

Hurd U.S. Pat. No. 4,336,698 relates to a lock for a lug nut in which an outer sleeve is relatively rotatable with respect to an inner sleeve received therein which provides a threaded connection with a bolt lock assembly, and which prevents axial separation therebetween unless a shearing action is applied thereto, possible resulting in extensive damage to the components.

From the foregoing, although fire hydrant guard structures in the form of various kinds of locks and cylindrical coupling members which are attached to the upper end of the first hydrant valve-actuating post are known in the technology, while being interconnected for relative rotation although axially secured, these structures normally employ metal rings, such as steel snap rings or the like, which must be sheared through with the application of considerable forces generating high stresses in order to allow for the separation between the cylindrical members, thereby frequently resulting in damage to the various components requiring either extensive remachining or reworking thereof, or even rendering these completely unusable for further service, and making these structures extremely expensive to service and/or replace.

SUMMARY OF THE INVENTION

Accordingly, the present invention provides for a fire hydrant locking structure which is somewhat similar to that set forth in Kopesky U.S. Pat. No. 4,620,428, but upon which it significantly improves in that instead of a snap ring which, for purposes of assembling the parts, initially must be compressed and which then employs the inherent "memory" or resilience of the material thereof for snapping into the cooperating or aligned grooves formed in the cylindrical members, there is inventively employed a locking ring of a soft or ductile metallic material possessed a low melting point liquidus. The material, in the shape of a rod, is continually drawn inwardly responsive to relative rotation between the cylindrical members through a radially extending bore formed in the outer cylindrical member, and communicates with the cooperating circumferential grooves in the mating surfaces of the cylindrical members so as to essentially fill the grooves and thereafter is sheared off subsequent to filling the grooves responsive to further rotation of the outer cylindrical member relative to the inner cylindrical member. Consequently, the locking ring formed from the relatively soft and ductile metallic material will provide for a locking restraint against the axial separation of the cylindrical members, while concurrently permitting relative rotation therebetween, thereby providing a security against external unauthorized tampering with the valve actuating device of the fire hydrant, in which the upper end of the valve-actuating post or stem of the fire hydrant is fixedly connected to the inner cylindrical member positioned on the upper end or bonnet of the fire hydrant.

Pursuant to the inventive structure, the locking ring which is introduced into the aligned grooves intermediate the relatively rotatable cylindrical members has a liquidus melting point which is substantially lower than that of the host members formed by the cylindrical members such that, upon application of a specified amount of heat causing the temperature of the locking ring to rise to a point above the liquidus melting point thereof, this will cause the material of the locking ring to melt and to flow downwardly and outwardly onto the bonnet through an annular gap present between the cylindrical members, thereby eliminating the locking or coupling connection therebetween and permitting for axial separation between the cylindrical members, and facilitating access to the interior of the fire hydrant. Hereby, inasmuch as the liquidus melting point of the locking ring is substantially lower than that of the material employed for the cylindrical members forming the host components for the locking ring, the cylindrical members will not be damaged or warped in any manner in response to the application of the heat, and upon appropriate cleaning and minor reconditioning thereof can be readily reemployed for their intended purposes.

Furthermore, pursuant to the invention there is provided a method of producing the coupling between the outer and inner cylindrical members constituting components of the fire hydrant locking arrangement whereby a bore is formed in the outer cylindrical member, which bore extends from the exterior thereof so as to terminate at its radially inner end in tangential communication with the circumferential grooves between the two cylindrical members, and whereby the soft and relatively ductile rod-like material for the locking ring is fed from the outside through the bore into the grooves until it substantially fills the circumference of the latter and whereby continued rotation between the outer and inner cylindrical members will shear off the material at the end of the locking ring still projecting from the grooves subsequent to its filling the 360° circumferential extent thereof. A small opening formed by the outer end of the bore at the circumference of the outer cylindrical member will not ordinarily permit the insertion of any tool which could conceivably push the material of the locking ring out of the groove, and consequently provides a substantially tamperproof construction while concurrently facilitating the ready separation between the cylindrical members, when desired, through the application of a suitable amount of heat tending to melt the material of the locking ring.

Accordingly, it is an object of the present invention to provide a fire hydrant locking arrangement which is essentially tamperproof in response to external unauthorized manipulation of the locking arrangement.

A further object of the present invention is to provide a fire hydrant locking arrangement of the type described in which a locking ring constituted of a generally soft and ductile metallic material and having a relatively low liquidus melting point in comparison with those of the cylindrical members receiving and hosting the locking ring in grooves formed in the members will facilitate a tamperproof axially coupled but rotatably free fire hydrant guard and locking structure protective of the internal valve mechanism of the fire hydrant.

Still another object of the present invention is to provide a method of producing a generally tamperproof fire hydrant locking arrangement of the type as described and contemplated herein.

BRIEF DESCRIPTION OF THE DRAWINGS

Reference may now be had to the following detailed description of an exemplary embodiment of a fire hydrant locking device pursuant to the invention, taken in conjunction with the accompanying drawings; in which:

FIG. 1 illustrates a vertical sectional view through a generally schematically represented fire hydrant;

FIG. 2 illustrates, on an enlarged scale, a vertical sectional view of the upper end of the fire hydrant incorporating the fire hydrant locking arrangement pursuant to the invention;

FIG. 3 illustrates a top plan view of the locking arrangement of FIG. 2;

FIG. 4 illustrates a transverse sectional view taken along line 4—4 in FIG. 2;

DETAILED DESCRIPTION

Figure 7:
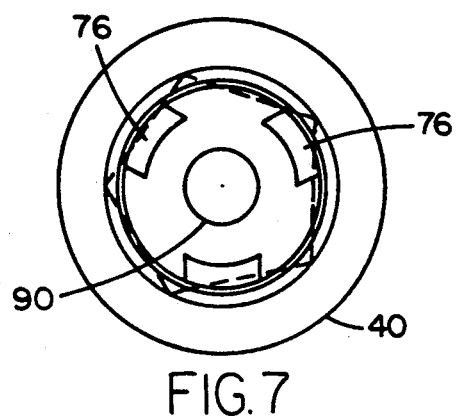
FIG. 7 illustrates a top view taken along line 7—7 in FIG. 6.
Figure 5:
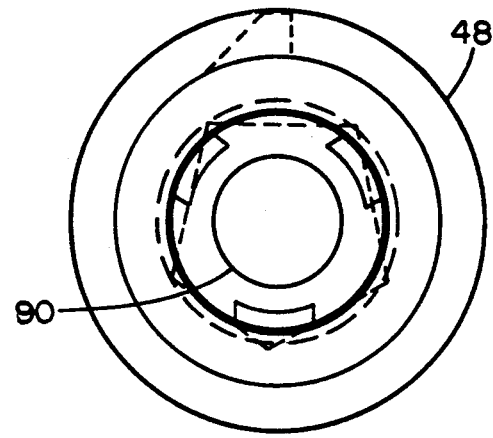
FIG. 5 illustrates a transverse sectional view taken along line 5—5 in FIG. 2.

Referring now in more specific detail to the drawings, in FIG. 1 there is disclosed a conventional fire hydrant 10, which may be of any standard construction widely installed in a multiplicity of urban and rural geographic regions. The fire hydrant includes an upstanding body or standpipe structure 12 having a bonnet 14 closing the upper end thereof. As is known in the positioning of fire hydrants, the standpipe 12 is normally connected at its lower end to a subterranean water main 16 which provides a flow of water thereto from a water source of the particular locality in which the fire hydrant is located, such as from a water storage tank or reservoir. A valve 18 which, similar to the water main 16 is located in the juncture with the standpipe 12 beneath the ground 20, is normally closed so as to inhibit the flow of water from the supply system or water main 16 into the standpipe towards an outlet 22 at the side of the pipe 12, which outlet 22 is normally closed off by a closure cap 24 actuatable by means of a wrench engaging a protruding polygonally-shaped post 26 on the cap.

In order to permit the flow of water from the water supply main 16 into the standpipe 12 and to allow discharge thereof through the outlet 22, such as in the case of a fire or the like emergency, the valve 18 is actuated into an open condition through the intermediary of a valve post connection 30 communicating with the valve 18 through a suitable actuating rod or linkage member 32. Generally, this is effected through the attachment of a suitable wrench or similar tool to the upper end of the member 30 extending through the bonnet 14, so as to enable imparting a rotational movement to the rod 32 tending to either open or close the valve 18 as is required. Consequently, this will initiate, control and terminate the flow of water from the water main 16 into the standpipe and its discharge from the outlet 22 (connectable to a fire hose, not shown).

At various times and locations, particularly during hot and sweltering summer months, unauthorized persons can easily apply a wrench to the upper end of the connector or valve stem 30 in an attempt to open the flow valve 18, and thereafter open the cap 24 on the discharge outlet 22 permitting a flow of water to stream from the fire hydrant into the street, such that children and/or adults may utilize the water to cool and disport themselves. However, this unauthorized opening of possibly large numbers of fire hydrants at any locality may dramatically decrease the available water pressure to such an extent below the pumping pressure required during an emergency situation, such as for fighting a fire, thereby creating a potentially dangerous situation, and concurrently produce a loss of appreciable quantities of needed water in areas which are subject to drought or various kinds of water shortages. The foregoing conditions may readily pose hazards to the population in those environments, and necessarily should be controlled by the authorities of the localities in which the fire hydrants are located.

In order to prevent, or at least render extremely difficult, the unauthorized tampering with and opening of fire hydrants by unauthorized persons, there has been proposed structure whereby the upper end of the connecting rod 32, such as the post or stem end 30 protruding from the bonnet is either physically disengaged from the valve, and through the application of a suitable wrench or tool may form a cooperating operative connection so as to enable the actuation of the water valve 18 to produce the flow of water. This may be carried out through the employment of suitable magnet structure which would not be readily accessible to an unauthorized person.

Figure 6:
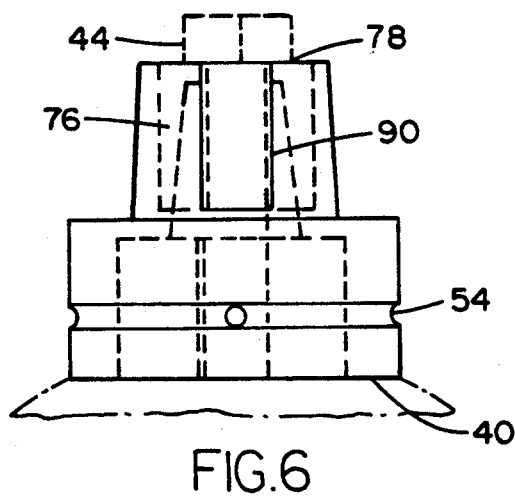
FIG. 6 illustrates an elevational view of the inner cylindrical member of the locking device.

Other fire hydrants contemplate the provision of guarding lock structure for the valve mechanism of the hydrant which is directly mounted at the upper end of a post protruding upwardly from the bonnet of the fire hydrant, such as is shown in FIG. 2 of the drawings. Hereby, an inner cylindrical member 40, as shown more specifically in FIGS. 6, 7 and 8, encompasses an upstanding end 42 of a post or valve-actuating stem of generally polygonal cross-section (such as, for instance, in the form of a pentagon) which extends vertically through the fire hydrant bonnet so as to engage with a connecting rod for the fire hydrant actuating valve 18, and is locked to the post end 42 by means of a vertically extending threaded bolt 44 so as to be rotatable therewith. For this purpose, the upper portion of the inner cylindrical member 40 has a bore 90 formed therein into which there may be inserted the bolt 44 so as to engage a threaded bore (not shown) at the upper end of the post end 42, the latter of which is seated in the polygonally-shaped recess 92 in the inner cylindrical member 40. Superimposed so as to extend coaxially about the inner cylindrical member 40 is a second or outer cylindrical member 48, generally in the shape of an inverted tapered cup, and in which internal cylindrical surface of the outer cylindrical member 48 are configured so as to form a narrow downwardly extending annular gap between the mating or external facing cylindrical surfaces of the inner cylindrical member 40. Formed in the facing circumferential surfaces of the outer and inner cylindrical members 48, 40 is an annular groove structure 50 which has a first groove portion 52 formed in and extending about the inner circumferential wall surface of the outer cylindrical member 48; and a second circumferential groove portion 54 in alignment with the first cylindrical groove portion 52, and which is formed in and extends about the circumferential outer wall surface of the inner cylindrical member 40. As shown in FIG. 4, a generally radially extending bore 58 is formed in the cylindrical member 48 so as to extend from the outer surface 60 thereof into tangential communication with the groove 50, with the bore 58 being essentially in the same plane as the groove 50, with the bore extending into alignment with a hole 85 in member 40 when the cylindrical members 40 and 48 are in an assembled superimposed arrangement, for a purpose as described hereinbelow.

In order to provide the novel fire hydrant locking arrangement pursuant to the present invention, a generally soft and ductile metallic rod-shaped material adapted to form a locking ring 62 is radially fed inwardly through the bore 58 from the exterior 60 of the outer cylindrical member 48 into the groove 50 so as to have the leading end of the rod material engage into hole 85 so as to, with the rotation of the outer member 48 relative to the inner cylindrical member 40 in the direction A as shown in FIG. 4, cause the rod material forming the locking ring member 62 to be continually drawn into the annular groove until it essentially fills the groove 50 for its entire circumference of 360°. Thereafter, upon continued rotation of the outer member 48 in direction A relative to the stationary inner cylindrical member 40, the edge which is present between the inner end of the bore 58 and the contiguous groove portion 54 will form a shearing surface cutting through the trailing end of the material forming the locking ring 62. Thereafter, the rod-shaped material remaining in the bore 58 may be pulled out of the cylindrical member 48 and the bore may be permitted to remain open at its outer end, although a small sheared-off piece of the rod-shaped material will remain in the hole 85 present in member 40. This structure, in effect, permits relative rotation between the inner and outer cylindrical members 40 and 48, due to the presence of the locking ring 62, but concurrently prevents any axial separation between the cylindrical members 40 and 48.

In order to provide the inventive locking structure, the material of the locking ring 62 has the property of a substantially lower melting point liquidus than the material of the host members consisting of the inner and outer cylindrical members 40 and 48. Thus, by way of example, and not limited thereto, the locking ring 62 may be constituted from a suitable alloy consisting of 95% by weight of tin and 5% by weight of antimony, having a melting point liquidus of approximately 464° F. The host members for the locking ring in which the groove 50 is formed; i.e. the latter consisting of the groove portions 52 and 54, such as the inner and outer cylindrical members 40 and 48, may each be constituted from a copper alloy having a melting point liquidus of approximately 1930° F.; for example, such as copper alloy C 95500.

Hereby, in order to allow for an axial separation between the cylindrical members 40 and 48; for instance, when access to the interior of the fire hydrant is required, heat is applied to the region about the groove 50 so as to increase the temperature therein to above 464° F., which will cause the material of the locking ring 62 to melt and to flow downwardly so as to discharge through the annular gap 70 which is present between the facing circumferential surfaces of the inner and outer cylindrical members 40, 48. Hereby, inasmuch as the melting point liquidus of the cylindrical members 40, 48 of about 1930° F. is approximately 1466° F. higher than that of the liquidus melting point liquidus for the locking ring, neither of the cylindrical members will be adversely affected by the heat applied thereto since the temperature level is far below that which would have any significant physical effect on the material of the two cylindrical members 40, 48.

In a specific instance of application for a fire hydrant, in which the locking ring 62 has a mean diameter of approximately 2.50 in. at the annular gap present between the grooves 52, 54 in the inner and outer cylindrical members 40 and 48, and a cross-sectional diameter of approximately 0.125 in., with the ring being constituted from the tin-antimony alloy wire or rod material, an axial force for shearing the ring required to separate the two cylindrical members 40, 48 would have to be at least about 10,000 lbs.; thereby attesting to the strength of the locking arrangement.

Figure 8:
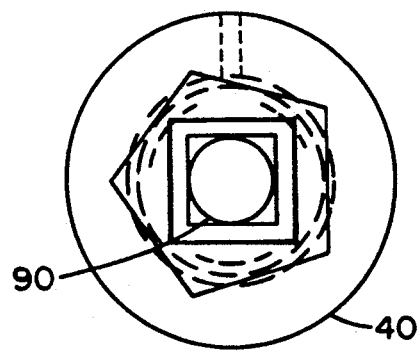
FIG. 8 illustrates a bottom plan view of FIG. 6.
Figure 9:
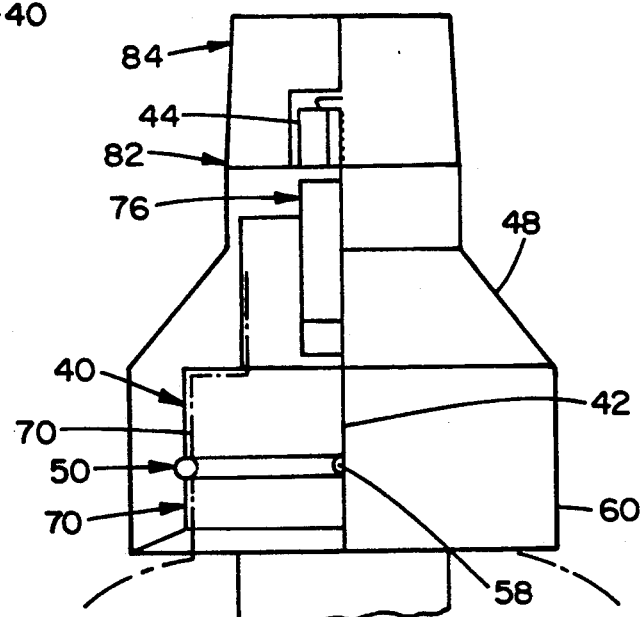
FIG. 9 illustrates a section view taken along line 9—9 in FIG. 2.

In order to facilitate coupling the two cylindrical members 40, 48 so as to be secured for rotation with each other, to thereby enable operation of the water flow valve 18, passive magnet element 76 may be positioned in circumferentially spaced recesses 78 formed in the upper end of the inner cylindrical member 40, three being shown in this instance for purposes of illustration in FIG. 7, whereby the magnet elements 76 may be drawn upwardly to partly engage into corresponding recesses 80 formed in the lower surfaces of the end wall 82 of the outer cylindrical member 48 so as to produce a locking engagement between the cylindrical members 40, 48 when it is desired to actuate the fire hydrant valve mechanism. This action may be provided by a suitable magnet-containing wrench grippingly engaging a nut 84, which may be pentagonal in cross-section, formed at the upper surface of the end wall 82 of the outer cylindrical member 48, as shown more clearly in FIG. 3, and being similar to the operation of the fire hydrant shown in U.S. Pat. No. 4,620,428, the disclosure of which is incorporated herein by reference.

From the foregoing, it becomes readily apparent that the arrangement clearly provides a security against unauthorized tampering with the operation of the fire hydrant while, concurrently, when desired, the locking arrangement may be simply disassembled by the application of heat causing melting of the locking ring 62 so as to enable the cylindrical members 40, 48 to disengage, and thereafter affording access to the internal components of the fire hydrant for any required servicing or replacement thereof.

While there has been shown and described what is considered to be a preferred embodiment of the invention, it will, of course, be understood that various modifications and changes in form or detail could readily be made without departing from the spirit of the invention. It is therefore intended that the invention not be limited to the exact form and detail herein shown and described, nor to anything less than the whole of the invention herein disclosed and as hereinafter claimed.

What is claimed is:

1. In a fire hydrant locking arrangement including an inner cylindrical member having a cavity for receiving a conforming configured upstanding post located on a fire hydrant, said post being fastened to said inner cylindrical member so as to be secured against rotational and axial displacement relative thereto, said post being operatively connected to operative structure of said fire hydrant; and an outer cylindrical member having an axially extending central bore terminating at an end wall, said bore having a peripheral wall surface for receiving said inner cylindrical member in closely spaced relationship and being rotatable relative thereto; at least a portion of said inner cylindrical member being axially movable into said bore so as to selectively couple said inner and outer cylindrical members to enable the operative structure of said firs hydrant to be actuated only by an authorized user the improvement comprising:

(a) oppositely facing, axially aligned groove means formed in, respectively, the outer circumferential surface of said inner cylindrical member and in the peripheral surface of the bore in said outer cylindrical member;

(b) and an annularly extending ring being positioned in said groove means facilitating relative rotation between said inner and outer cylindrical members while coupling said members so as to concurrently prevent relative axial displacement therebetween, said ring being constituted from a generally ductile material possessing a substantially lower melting point than the material of each of said cylindrical members whereby application of heat at temperatures in excess of the liquidus melting point of the material of said ring to the region of said locking arrangement containing said ring will cause said ring to melt and flow out of said groove means and through an annular gap present between said cylindrical members so as to enable an easy axial removal of said outer cylindrical member from said inner cylindrical member.

2. A fire hydrant locking arrangement as claimed in claim 1, wherein said inner and outer cylindrical members and said ring are each constituted from a metallic material.

3. A fire hydrant locking arrangement as claimed in claim 2, wherein said inner and outer cylindrical members are each constituted from a copper alloy having a liquidus melting point of about 1930° F.

4. A fire hydrant locking arrangement as claimed in claim 3, wherein said ring for coupling said inner and outer cylindrical members is constituted from an alloy of about 95% by weight of tin and 5% by weight of antimony, said alloy having a liquidus melting point of about 464° F.

5. A fire hydrant locking arrangement as claimed in claim 4, wherein said ring arranged in said groove means in said inner and outer cylindrical members has a mean circumferential diameter of about 2.5 inches and a cross-sectional diameter of about 0.125 inches and is resistant to an axial shearing force of about 10,000 pounds.

6. A fire hydrant locking arrangement as claimed in claim 1, wherein a bore in said outer cylindrical member extends between the external surface thereof and said groove means, said bore tangentially communicating with said groove means to facilitate feeding said ductile material through said bore into said groove means to form said ring for coupling said inner and outer cylindrical members.

7. A fire hydrant locking arrangement as claimed in claim 6, wherein said ductile material for forming said ring comprises a solid rod member having a circular cross-section.

8. A fire hydrant locking arrangement as claimed in claim 6, wherein said bore in said outer cylindrical member extends in coplanar relationship with said groove means.

9. A method of providing a fire hydrant locking arrangement including an inner cylindrical member having a cavity for receiving a conforming configured upstanding post located on a fire hydrant, said post being fastened to said inner cylindrical member so as to be secured against rotational and axial displacement relative thereto, said post being operatively connected to operative structure of said fire hydrant; and an outer cylindrical member having an axially extending central bore terminating at an end wall, said bore having a peripheral wall surface for receiving said inner cylindrical member in closely spaced relationship and being rotatable relative thereto; at least a portion of said inner cylindrical member being axially movable into said bore so as to selectively couple said inner and outer cylindrical members to enable the operative structure of said fire hydrant to be actuated only by an authorized user comprising:

(a) providing oppositely facing, axially aligned grooves in, respectively, the outer circumferential surface of said inner cylindrical member and in the peripheral surface of the bore in said outer cylindrical member;

(b) and introducing an annularly extending ring into said grooves so as to facilitate relative rotation between said inner and outer cylindrical members and with said ring coupling said members so as to concurrently prevent relative axial displacement therebetween, said ring being constituted from a generally ductile material possessing a substantially lower melting point than the material of each of said cylindrical members whereby application of heat at temperature in excess of the liquidus melting point of the material of said ring to the region of said locking arrangement containing said ring causes said ring to melt and flow out of said grooves and through an annular gap present between said cylindrical members so as to enable an easy axial removal of said outer cylindrical member from said inner cylindrical member.

10. A method as claimed in claim 9, wherein said inner and outer cylindrical members and said ring are each constituted from metallic materials.

11. A method as claimed in claim 10, wherein said inner and outer cylindrical members are each constituted from a copper alloy having a liquidus melting point of about 1930° F.

12. A method as claimed in claim 11, wherein said ring for coupling said inner and outer cylindrical members is constituted from an alloy of about 95% by weight of tin and 5% by weight of antimony, said alloy having a liquidus melting point of about 464° F.

13. A method as claimed in claim 12, wherein said ring arranged in said grooves in said inner and outer cylindrical means has a mean circumferential diameter of about 2.5 inches and a cross-sectional diameter of about 0.125 inches and is resistant to an axial shearing force of about 10,000 pounds.

14. A method as claimed in claim 9, wherein a bore is formed in said outer cylindrical member extending between the external surface of said member and said grooves, said bore tangentially communicating with said grooves; drawing a continuous rod of said ductile material through said bore into said grooves; and imparting rotation to said outer cylindrical member relative to said inner cylindrical member to cause said rod-shaped ductile material to be drawn into and fill said grooves.

15. A method as claimed in claim 14, wherein said relative rotation between said inner and outer cylindrical members in effected through an angle of at least 360° so as to cause said rod-like ductile material to extend along the entire circumferential length of said grooves; and shearing the trailing end of said material upon continued relative rotation between said members so as to form said locking ring coupling said members.

16. A method as claimed in claim 15, wherein said bore in said outer cylindrical member and said aligned grooves are in substantially coplanar relationship.

17. A method as claimed in claim 14, wherein said rod-shaped ductile material is generally circular in cross-section.

* * * * *